Aug. 19, 1947.   W. H. FITZGERALD, JR   2,426,089
OPERATION INDICATOR FOR AIRPLANE ENGINES
Filed Nov. 14, 1944   2 Sheets-Sheet 1

Inventor
Walter H. Fitzgerald, Jr.

Aug. 19, 1947.  W. H. FITZGERALD, JR  2,426,089
OPERATION INDICATOR FOR AIRPLANE ENGINES
Filed Nov. 14, 1944  2 Sheets-Sheet 2
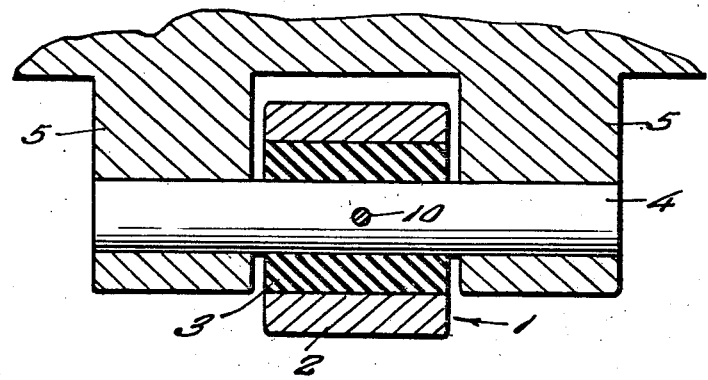
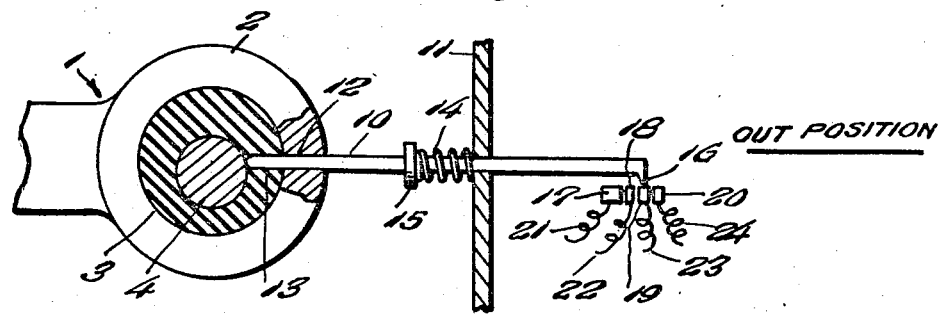
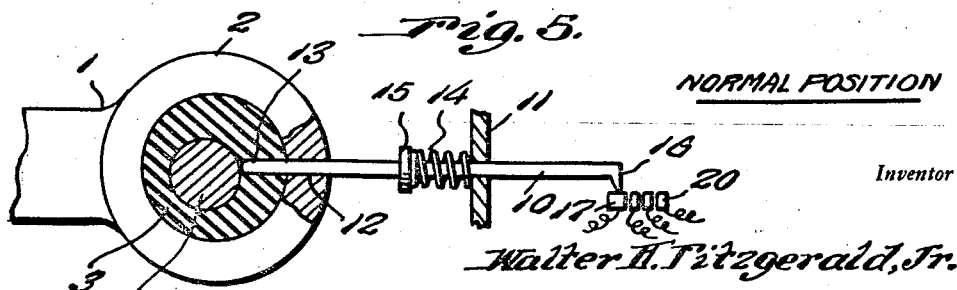
Inventor
Walter H. Fitzgerald, Jr.
By Clarence A. O'Brien
and Harvey B. Jacobson
Attorneys Patented Aug. 19, 1947

2,426,089

UNITED STATES PATENT OFFICE 2,426,089

OPERATION INDICATOR FOR AIRPLANE ENGINES

Walter H. Fitzgerald, Jr., Carrollton, Tex.

Application November 14, 1944, Serial No. 563,440

2 Claims. (Cl. 73—116)

My invention relates to improvements in operation indicators for airplane engines, and the like.

As explanatory, in multi-engine airplanes, it is exceedingly difficult, particularly in flight, to ascertain if any particular engine is dead, running normally and smoothly, or roughly, without an individual separate check of each engine, which operation requires time and labor which may prove costly. Such engines are installed on resilient supports involving floating bolts passing through annular resilient liners of fixed amounts. When the engine is dead, or is running normally and smoothly, or roughly, these bolts assume different positions eccentric to the axis of the resilient liners, due to dead weight when the engine is dead, and torque when the engine is running.

Having the foregoing in mind, it is the primary object of my invention to provide a simple form of device operative electrically under control of a floating bolt of an airplane engine support to indicate visibly whether the engine is dead, operating normally and smoothly, or roughly, or very roughly, and which is easy to install, involves few parts, is accurate, dependable, and inexpensive to manufacture and install.

Other objects, also comprehended by my invention, together with the precise nature of my improvements, and the advantages thereof, will become readily apparent when the succeeding description and claims are read with reference to the drawings accompanying and forming part of this specification.

Figure 1:
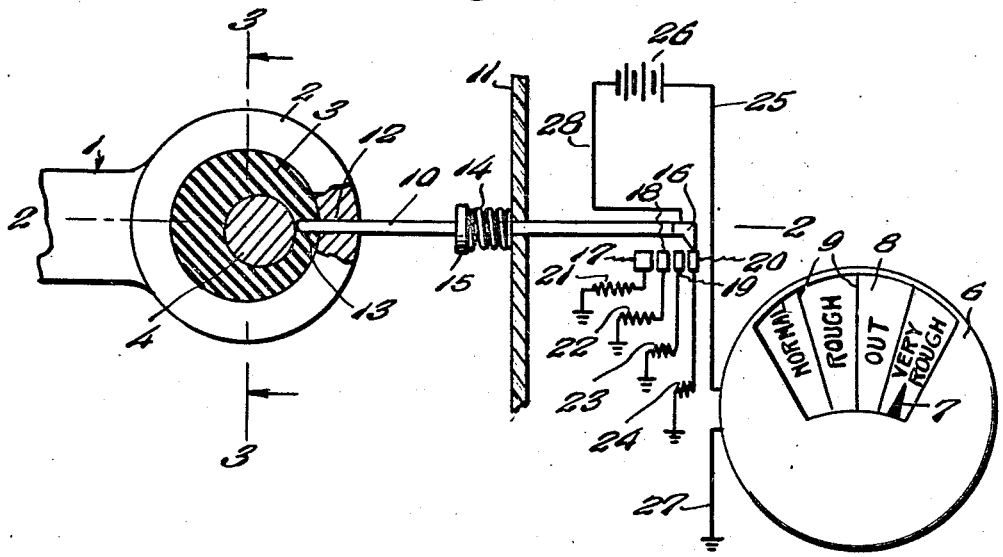
Figure 2:
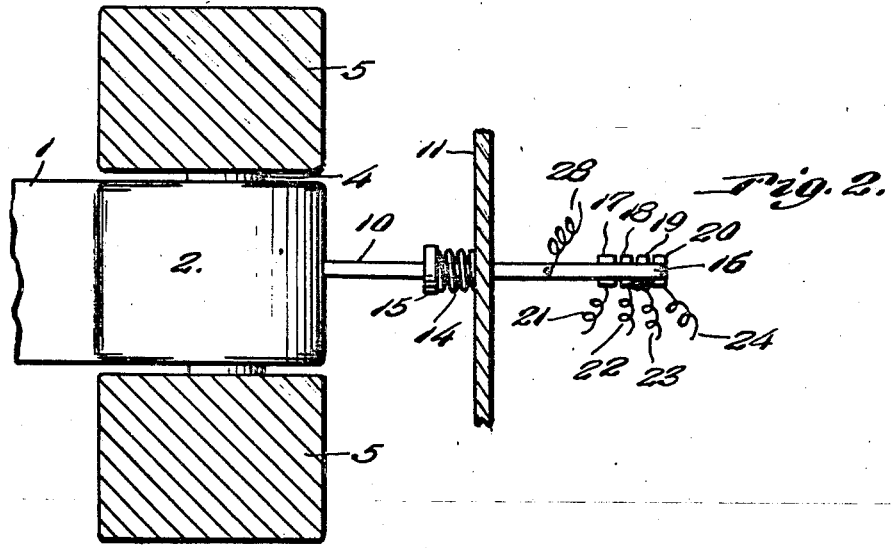

In said drawings:

Figure 1 is a view, partly in vertical section and partly in side elevation, illustrating my improved operation indicator conditioned to indicate very rough operation of an airplane engine, Figure 2 is a view in horizontal section taken on the line 2—2 of Figure 1, Figure 3 is a view in vertical section taken on the line 3—3 of Figure 1, Figure 4 is a view similar to Figure 1, but illustrating the indicator conditioned to indicate that the engine is dead, and Figure 5 is another view similar to Figure 1, but illustrating the indicator as conditioned to indicate normal smooth operation of the engine.

Referring to the drawings by numerals, 1 designates a usual type of fixed mount for an airplane engine, not shown, and which comprises an annular sleeve 2 provided with a resilient sleeve-type liner 3 therein of rubber, through which one of the engine-securing bolts 4 is extended, normally axially, with its ends fixed in engine parts represented at 5.

According to my invention, an indicator instrument 6, of any of the usual types embodying an electrically operated indicator hand 7, is provided for mounting in any desired manner in a fixed position in the airplane, not shown, the instrument embodying a graduated face dial 8 bearing between the graduations 9 thereof the legends "Normal," "Rough," "Out," "Very rough," reading from left to right in the order named and with which the indicator hand 7 cooperates in the usual manner.

A rod-like feeler finger 10 of non-conductive material, with the exception presently noted, is slidably extended, intermediate its ends, through a suitable guide 11 in the plane of the support 1 and with its front end portion slidably extended through a suitable radial bore 12 in the sleeve 2 and another similar bore 13 in the sleeve 3 so that said front end of the feeler finger engages one side of the bolt 4. A coiled expansion spring 14 surrounding the feeler finger intermediate the guide 11 and a fixed collar 15 on said finger urges the feeler finger 10 toward the bolt 4 and maintains the front end of said finger in wiping engagement with said bolt.

The rear end of the feeler finger 10 is provided with a laterally extending contact 16, adapted, when the feeler finger 10 is reciprocated, to wipe over a row of contacts 17, 18, 19, 20, suitably mounted in fixed position, and which are grounded through resistances 21, 22, 23, 24, respectively, of successively lower resistance. The indicator instrument 6 is designed to be connected in circuit with any one of said resistances by means of a circuit wire 25 leading from one side of said instrument to one side of a battery 26, the other side of said instrument being connected to ground, as by the wire 27, and the other side of the battery 26 being connected to the contact 16 by a circuit wire 28. The resistances 21, 22, 23, 24, when connected in circuit with the instrument 6, are arranged to control the indicator hand 7 to indicate the legends "Normal," "Rough," "Out," and "Very rough," respectively.

Referring now to the operation of the invention. When the engine is dead, the bolt 4 assumes a downward, eccentric position in vertical alignment with the axis of the sleeves 2, 3, as shown in Figure 4; the spring 14 thrusts the feeler finger 10 forwardly against said bolt so that the contact 16 is advanced into engagement with the contact 19, thus completing a circuit through the resistance 23 to ground. This causes the indicator hand 7 to swing into a position opposite the legend "Out," thus indicating that the engine is dead. The circuit thus closed may be traced through the ground wire 27 to one side of the instrument 6, over circuit wire 25 from the other side of said instrument to the battery 26, and from the battery to the contact 16, then through contact 19 and resistance 23 to ground. When the engine is operating normally, and smoothly, the bolt 4 is swung clockwise into an eccentric position relative to the axis of the sleeves 2, 3, as shown in Figure 5, under the torque created by operation and other factors. In this position of the bolt 4, the spring 14 thrusts the feeler finger 10 forwardly sufficiently to engage the contact 16 with the contact 17, thus closing the circuit through the instrument 6 with the resistance 21 interposed in the circuit and causing the indicator hand to swing into a position opposite "Normal." When the engine is operating roughly, slightly the bolt 4 vibrates about a mean position somewhere between "Normal" and "Out" positions and under such vibration moves eccentrically of the axis of the sleeves 2, 3 counter-clockwise from vertical alignment with said axis, thus thrusting the feeler finger 19 rearwardly in opposition to the spring 14 to engage the contact 16 with the contact 18 and close the circuit with the resistance 22 interposed therein, thus causing the indicator hand 7 to assume a position opposite the legend "Rough." When the engine is operating very roughly, the bolt 4 vibrates through a wider range from said mean position and as a result of greater amplitude of vibration moves further counter-clockwise, as shown in Figure 1, thrusting the feeler finger 10 further rearwardly to engage contact 16 with the contact 20 at one end of the range of vibration of said bolt and thereby close the circuit with the resistance 24 interposed therein, thus causing the indicator hand 7 to swing into a position opposite the legend "Very roughly." Of course, when the engine is operating roughly, as a result of greater amplitude of vibration of the bolt 4, the contact 16 will wipingly engage, momentarily, the contact 19, causing said hand 7 to indicate "Out" at the opposite end of the range of vibration of said bolt. However, when said hand 7 vibrates over "Out" and "Very rough" on the face dial 8, the indication "Out" may be disregarded and the indication "Very rough" considered solely as signifying the running condition of the engine.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In combination with a floating mounting of an engine including a resilient bushing carried by fixed mounting element and through which an engine securing bolt extends, said engine being so mounted that when the same is not operating the dead weight thereof causes the bolt to assume one position within the resilient bushing, the torque of the engine when operating normally causes the bolt to assume a different position and rough operation of the engine causes the bolt to vibrate over a range of positions dependent upon the degree of roughness, an instrument for indicating the nature of the engine operation or its non-operation, and means for actuating said instrument in response to movement of said bolt comprising an electric circuit, resistances of different values, and a feeler finger for selectively interposing said resistances in the circuit slidably mounted and spring pressed to engage and follow said bolt.

2. In combination with a floating mounting of an engine including a resilient bushing carried by a fixed mounting element and through which an engine securing bolt extends, said engine being so mounted that when the same is not operating the dead weight thereof causes the bolt to assume one position within the resilient bushing, the torque of the engine when operating normally causes the bolt to assume a different position and rough operation of the engine causes the bolt to vibrate over a range of positions dependent upon the degree of roughness, an instrument for indicating the nature of the engine operation or its non-operation, and means for actuating said instrument in response to movement of said bolt comprising an electric circuit, resistances of different values, and a feeler finger for selectively interposing said resistances in the circuit slidably mounted and spring pressed to engage and follow said bolt, said feeler finger slidably extending through said fixed mounting element and into said bushing to said bolt.

WALTER H. FITZGERALD, Jr.

REFERENCES CITED

The following references are of record in the file of this patent:

UNITED STATES PATENTS

| Number | Name | Date |
|---|---|---|
| 2,095,142 | Lurenbaum | Oct. 5, 1937 |
| 996,170 | Vannatter | June 27, 1911 |
| 2,167,533 | Solomon | July 25, 1939 |
| 1,057,261 | Norton | Mar. 25, 1913 |
| 2,248,653 | Allendorff | Jan. 27, 1939 |

FOREIGN PATENTS

| Number | Country | Date |
|---|---|---|
| 145,371 | Austria | Apr. 25, 1936 |
| 500,247 | Great Britain | Feb. 6, 1939 |